United States Patent [19]
Urankar

[11] 3,952,668
[45] Apr. 27, 1976

[54] ELECTRODYNAMIC SUSPENSION GUIDANCE SYSTEM

[75] Inventor: Laxmikant Urankar, Erlangen, Germany

[73] Assignee: Siemens Aktiengesellschaft, Munich, Germany

[22] Filed: Oct. 24, 1974

[21] Appl. No.: 517,589

[30] Foreign Application Priority Data
Nov. 16, 1973 Germany............................ 2357325

[52] U.S. Cl..................... 104/148 SS; 104/148 MS
[51] Int. Cl.²......................................... B61B 13/08
[58] Field of Search.............. 104/148 MS, 148 LM, 104/148 SS

[56] References Cited
UNITED STATES PATENTS

| | | | |
|---|---|---|---|
| 3,470,828 | 10/1969 | Powell | 104/148 |
| 3,820,470 | 6/1974 | Karch | 104/148 MS |
| 3,834,317 | 9/1974 | Miericke | 104/148 SS |

Primary Examiner—Trygve M. Blix
Assistant Examiner—Reinhard J. Eisenzopf
Attorney, Agent, or Firm—Kenyon & Kenyon Reilly Carr & Chapin

[57] ABSTRACT

An improved electrodynamic suspension guidance system for a moving vehicle in which primary conductor loops or magnet coils are mounted to a vehicle in rows parallel to the travel direction, with pairs of magnet coils disposed horizontally one above the other to form a zero flux system with a secondary conductor loop or conductor plate or rail disposed along the road bed, in which the magnet field generated by the upper magnet coil in at least some of the pairs is stronger than the magnetic field generated by the corresponding lower magnet coil of the pair in order to obtain a symmetrical position of the magnet coils with respect to the conductor plate thereby compensating for vehicle weight such that the suspension height tolerances are not decreased.

5 Claims, 2 Drawing Figures

ELECTRODYNAMIC SUSPENSION GUIDANCE SYSTEM

BACKGROUND OF THE INVENTION

This invention relates to the electrodynamic suspension and guidance of moving vehicles in general and more particularly to an improved system for obtaining such suspension in a zero flux system.

It is well known that in the art that, in an electrodynamic guidance system for a moving vehicle, primary conductor loops or magnet loops can be mounted on the vehicle and used to produce in a secondary conductor loop or secondary conductor rail, preferably a plate of nonmagnetic material, eddy currents which generate magnetic repulsion forces and which act to maintain the vehicle in a suspended state. Furthermore lateral guidance or horizontal stabilization of the vehicle can be obtained by using additional secondary conductor means on the roadbed cooperating with the same or different primary conducting magnet loops in the vehicle. Preferably in such installations the primary conductor loops or magnet coils on the vehicle are superconducting coils. The secondary conductors are preferably made of an aluminum or an aluminum alloy and are sometimes referred to as lifting loops or stabilizing loops.

One of the earliest known magnetic suspension and guidance systems for a vehicle illustrating the system having magnets carrying large currents producing lifting forced by interacting with an electrically conductive portion of a track on a road bed or the like is shown in U.S. Pat. No. 1,020,943. As disclosed therein the lifting forces counteract the gravity of the vehicle and keeps the moving vehicle in a suspended state above the tracks. More recently a number of embodiments of an electrodynamic suspension guidance system using magnetic repulsive forces have been disclosed in U.S. Pat. No. 3,470,828. As disclosed in there a plurality of magnet systems are mounted to the vehicle, one behind the other in the travel direction. Each magnet system includes vehicle mounted superconducting magnet loops and track mounted normally conducting rail loops wound in the opposite sense. In the rail loops, which are disposed parallel next to each other in the travel direction and parallel to the vehicle loops, reaction forces are produced which keep the vehicle in a stable position in the horizontal plane. In this system, as soon as the vehicle and with it its vehicle loops, departs from a central position in the vertical direction the track loops will be permeated by a greater flux to generate a restoring force in the direction of what is referred to as the zero position. In this zero position virtually no currents are generated. Thus, this type of an electrodynamic suspension guidance system is referred to as a zero or null flux system.

In the arrangement described in that reference, additional stablizing loops for generating horizontal guidance forces may be disposed vertically above or below the superconducting loops. In addition it is also possible to mount the lifting loops needed for suspension either vertically next to the vehicle loops as shown on FIG. 11 or horizontally above and below the vehicle loops as shown on FIG. 13. Furthermore as illustrated by FIG. 19 of that reference they may be divided into several partial loops between which is located a vertically disposed stabilizing loop for the generation of a horizontal guidance force.

Another electrodynamic suspension guidance system having a zero flux system disposed on each side of the vehicle and an additional system in the center under the vehicle is disclosed int the publication "Cryogenics and Industrial Gases", Oct. 1969, pages 19 to 24. The laterally disposed zero flux systems are used for suspension and the system disposed under the vehicle for lateral guidance.

In each of these systems the vehicle mounted superconducting magnet coils which are disposed in pairs vertically above one another and energized in an opposite sense to each other are guided along side an electrically conductive, nonmagnetic, track mounted rail arranged horizontally and composed of a plurality of conductor loops disposed one behind the other in the travel direction in such a manner that the rail is located between two magnet coils disposed vertically above the other. The rail is thin in relation to the depth to which the magnetic field penetrates the rail material. As a result losses and the braking forces associated therewith are generated only when the rail is not located exactly in the middle between the coils of a respective pair of coils. In the first approximation, the braking force is proportional to the second power of the deflection from the zero position. The lifting force generated is, in the first approximation, directly proportional to the deflection. Because of this superposition of forces a stable suspension of the vehicle can be achieved.

However in the zero flux system the lifting loop or rail on the roadbed are not exactly in the center plane between the magnet coils which are above and below the rail because the weight of the vehicle and the mounting coils mounted thereon represent an additional force causing the upper magnet coils to be closer to the lifting loops than the lower magnet. That is to say, that there is a necessity that a force be generated to offset the force of gravity. As a result the spacing of the reaction rail relative to the magnet coils differ between the upper and lower coils. As a result the safety tolerance with respect to vertical motion of the vehicle is less in a downward direction than in the upward direction.

In view of this deficiency, it is an object of the present invention to provide an improved electrodynamic suspension system of this nature in which the vehicle is suspended using a zero flux system and in which the magnet coils are approximately symmetrical with respect to the secondary conductor loop or rail.

SUMMARY OF THE INVENTION

This object is obtained in accordance with the present invention by providing that in at least in some of the magnet coil pairs, a magnetic field generated by the upper magnet coil which is stronger than the magnetic field generated by the corresponding lower magnet coil. This results in the distance between the secondary conductor rails and the primary magnet coils in the vehicle being approximately the same. This design of an electrodynamic suspension system has as its primary advantage the capability of achieving an approximately uniform distance between the reaction rail and both the upper and lower magnet coils through the asymmetry of the magnetic field action upon the reaction rail. This in turn makes it possible to effectively increase the maximum suspension level of the system which is always determined by the shortest distance between the magnet coils and the rail.

In accordance with a further feature of the present invention control of the magnetic fields of mutually coordinated magnet coils can be provided as a function of vehicle speed. This feature makes it possible to achieve in the zero flux system an adaptation to the curve of the velocity dependent specific braking losses which are defined as a product of the vehicle speed and the braking force per lifting force.

In order to generate the required asymmetrical magnet field relative to the center plane between the magnet coils of the magnet coil pairs, it is possible to construct the magnet coils of the same structural size but energize the upper magnet coil more strongly than the corresponding lower magnet coil. In otherwords the excitation current in the upper magnet coil can be increased to a point where the zero flux zone shifts in a vertical direction by just the amount which would result as a deflection due to the weight of the vehicle if the excitation of both magnet coils were the same.

Alternatively, the upper magnet coil may be wound with a greater number of turns than the lower magnet coils corresponding thereto. In such a case the both coils may be energized with the same operating current or a current which is approximately the same. Such is particularly helpful where superconducting materials are used for the windings of the coils since it permits uniform tolerances for the maximum current load which the conductors can carry.

DETAILED DESCRIPTION OF THE PREFERRED EMBODIMENT

Figure 1:
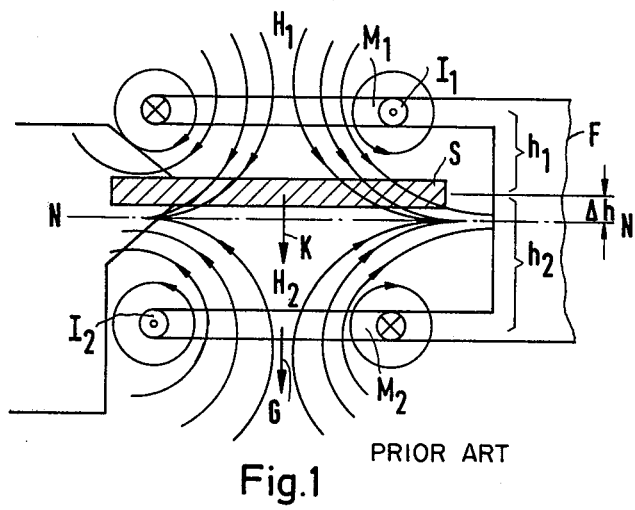
FIG. 1 is a cross sectional schematic illustration of a prior art zero flux system.

FIG. 1 illustrates a typical prior art zero flux system and is helpful in understanding the problem which the present invention resolves. In this zero flux system electrodynamic suspension is obtained due to the interaction of the two magnet coils $M_1$ and $M_2$ with the secondary conductor rail S. The magnet coils are of identical design and have currents $I_1$ and $I_2$ flowing therethrough respectively. The currents are of identical magnitude but of opposite direction and thus generate two oppositely oriented magnet fields $H_1$ and $H_2$. The field lines of the magnetic fields $H_1$ and $H_2$ are represented on FIG. 1 with lines having arrows. The center plane between the magnet coils $M_1$ and $M_2$ represents what is referred to as zero or a null flux zone N. On the drawing this plane is indicated by a dot-dash line. Disposed within the common magnetic field $H_1$ and $H_2$ of the magnet coils $M_1$ and $M_2$ is the secondary conductor rail or lifting loop S of nonmagnetic material. As illustrated it may be in the form of a plate or a rail. The lifting loop or rail S preferably will be made of aluminum or an aluminum alloy. If it moves within the zero flux zone N the currents induced in it, and hence the guidance and braking forces have a minimum value. However if it is deflected from the center line N, eddy currents are induced in the rail S according to the electrodynamic principle and generate a force K which acts upon it in a direction toward the zero flux zone N. Thus the force K is a restoring force. The stiffness of the zero flux arrangement increases as the currents $I_1$ and $I_2$ in the magnet coils $M_1$ and $M_2$ increase or when the mutual spacing of the magnet coils $M_1$ and $M_2$ become smaller. As noted above, the magnet coils $M_1$ and $M_2$ will preferably be superconducting magnets. The losses in the zero flux zone N remain zero in the rail S as long as the finite thickness of the rail may be neglected.

However, it is not possible to maintain the rail S exactly in the plane N. Gravity acts upon the vehicle which is rigidly joined to the magnet coils $M_1$ and $M_2$, a portion of the vehicle F being shown on the Figure. As a result there is a vertical deflection of the rail S out of the zero flux zone by an amount equal to the height $\Delta h$. On the Figure, the gravitational force is indicated by an arrow labeled G. This force is compensated for by the restoring force K of the electrodynamic flux system causing the vehicle to find itself in the stable position. Note, that, although the force K on the rail is shown in the same direction as the gravitational force, the reaction rail S is fixed and thus it is the force opposite to K acting on the magnet coils $M_1$ and $M_2$ and the vehicle which actually counteracts the force G. The result of this gravitational force is, as illustrated on the Fig. an unequal spacing between the center of the rail S and the respective magnet coils $M_1$ and $M_2$. The spacing between the rail S and magnet coil $M_1$ is only $h_1$ for as the spacing between the rail S and the magnet coil $M_2$ is a distance $h_2$ which is considerably larger. This leads to a reduction of the suspension height tolerances by an amount of $½ (h_1 + h_2 - 2\Delta h)$. The vehicle's freedom of motion in the vertical direction is thus reduced accordingly.

Figure 2:
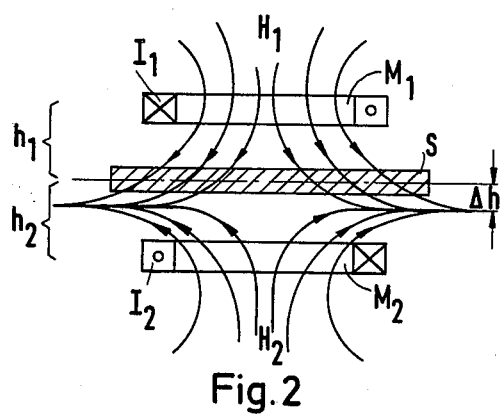
FIG. 2 is a similar illustration of a zero flux system according to the present invention.

FIG. 2 illustrates the manner in which the present invention overcomes this problem. Again a conducting rail S is disposed between the magnet coils $M_1$ and $M_2$. However, the magnetic field $H_1$ of the magnet coil $M_1$ is increased and is greater than that of the magnet coil $M_1$. As a result, the zero flux zone is located closer to the magnet coil $M_2$. By properly selecting the field strengths, the zero flux zone is caused to occur at a distance $\Delta h$ below the center of the rail S. In this way it is possible to assure that the rail S is approximately in the center plane of the two magnet coils $M_1$ and $M_2$. In this embodiment the distance $h_1$ from the upper magnet coil $M_1$ to the center of the rail S is approximately equal to the distance $h_2$ from the lower magnet coil $M_2$ to the center of the plate S. Thus, by generating a field $H_1$ which is stronger than the field $H_2$ in an amount which will just compensate for the deflection $\Delta h$ due to the weight of the vehicle, full tolerances in vertical suspension in both directions can be maintained.

The field $H_1$ of greater magnitude can be obtained by having a larger current $I_1$ flow in the magnet coil $M_1$ than the current I flowing in the magnet coil $M_2$. Alternatively the greater field can be obtained using equal currents and a greater number of turns in a magnet coil $M_1$.

Furthermore since the specific braking losses are also dependent on speed in a zero flux system of this nature it may be advantageous under certain circumstances to control the increase of the current $I_1$ in the upper magnet coil $M_1$ in accordance with speed.

The system of the present invention has been disclosed in an embodiment where the secondary conductor members are mounted to the roadbed. It should be noted however, systems corresponding to that of the present invention are also suitable for use in a vehicle suspended from a support system or in vehicles having a magnet system in which the magnet coils are magnetically coupled to stablizing systems such as that disclosed in U.S. Pat. No. 3,903,809. A magnet system which is sufficiently stable with respect to rotary forces about the axis in the travel direction is obtained through the relatively large width of the reaction rails and magnet coils. In addition it may be expedient under some circumstances to provide a plurality of such magnet systems for a single vehicle. These and other modifications may be made without departing from the spirit of the invention which is intended to be limited solely by the appended claims.

What is claimed is:

1. In an electrodynamic suspension guidance system for a track-bound moving vehicle which includes rows of vehicle mounted pairs of magnet coils the coils in each pair disposed horizontally one over the other with a gap between, the pairs disposed one behind the other in the travel direction and which magnet pairs cooperate with secondary conductor means, of a nonmagnetic electrically conductive material mounted to the roadbed and disposed in said gap, to form a zero flux system, which is self-controlling wherein the improvement comprises at least some of the magnet coil pairs arranged so that the upper magnet coil generates a magnetic field which is stronger than the magnetic field generated by the lower magnet coil the difference being such as to cause the distances between the reaction rail and the respective magnet coils to be approximately equal.

2. A system according to claim 1 wherein the strength of said magnetic fields of said magnetic coils in at least some of said pairs is controlled as a function of the speed of the vehicle.

3. A system according to claim 1 wherein, in said at least some of said pairs, magnet coils of the same structural size are provided and wherein the upper magnet coil in said pairs is energized with a higher current than the corresponding lower magnet in said pairs.

4. A system according to claim 1 wherein, in said at least some pairs of magnet coils, the upper magnet coil has a greater number of windings than the lower magnet coil of that pair.

5. A system according to claim 4 wherein said at least some pairs the currents in said upper and lower magnet coils are approximately the same.

* * * * *